(12) United States Patent
Kashiwaba

(10) Patent No.: US 6,381,076 B1
(45) Date of Patent: Apr. 30, 2002

(54) ZOOM LENS BARREL

(75) Inventor: Seiichi Kashiwaba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/669,803

(22) Filed: Sep. 26, 2000

(51) Int. Cl.⁷ .............................. G02B 15/14; G02B 7/02
(52) U.S. Cl. ...................................... 359/701; 359/823
(58) Field of Search ................................ 359/699, 700, 359/701, 823; 396/86

(56) References Cited

U.S. PATENT DOCUMENTS 5,832,318 A * 11/1998 Sato et al. ..................... 396/86
5,973,857 A * 10/1999 Kaneda ....................... 359/701
6,141,158 A * 10/2000 Kaneda ....................... 359/696

* cited by examiner

Primary Examiner—Ricky Mack
(74) Attorney, Agent, or Firm—Robin, Blecker & Daley

(57) ABSTRACT

A zoom lens apparatus having an optical axis includes a zoom cam tube arranged to rotate around the optical axis and having a cam groove for moving a variator lens along the optical axis, and a focus cam tube having a cam groove for moving a focusing lens along the optical axis, wherein the focus cam tube rotates around the optical axis and moves along the optical axis in association with the rotation of the zoom cam tube during zooming, and wherein a rotational speed of the zoom cam tube and a rotational speed of the focus cam tube during zooming are different from each other, so that the zoom lens barrel has excellent zooming operability by reducing torque changes in operation due to the zooming operation.

40 Claims, 6 Drawing Sheets

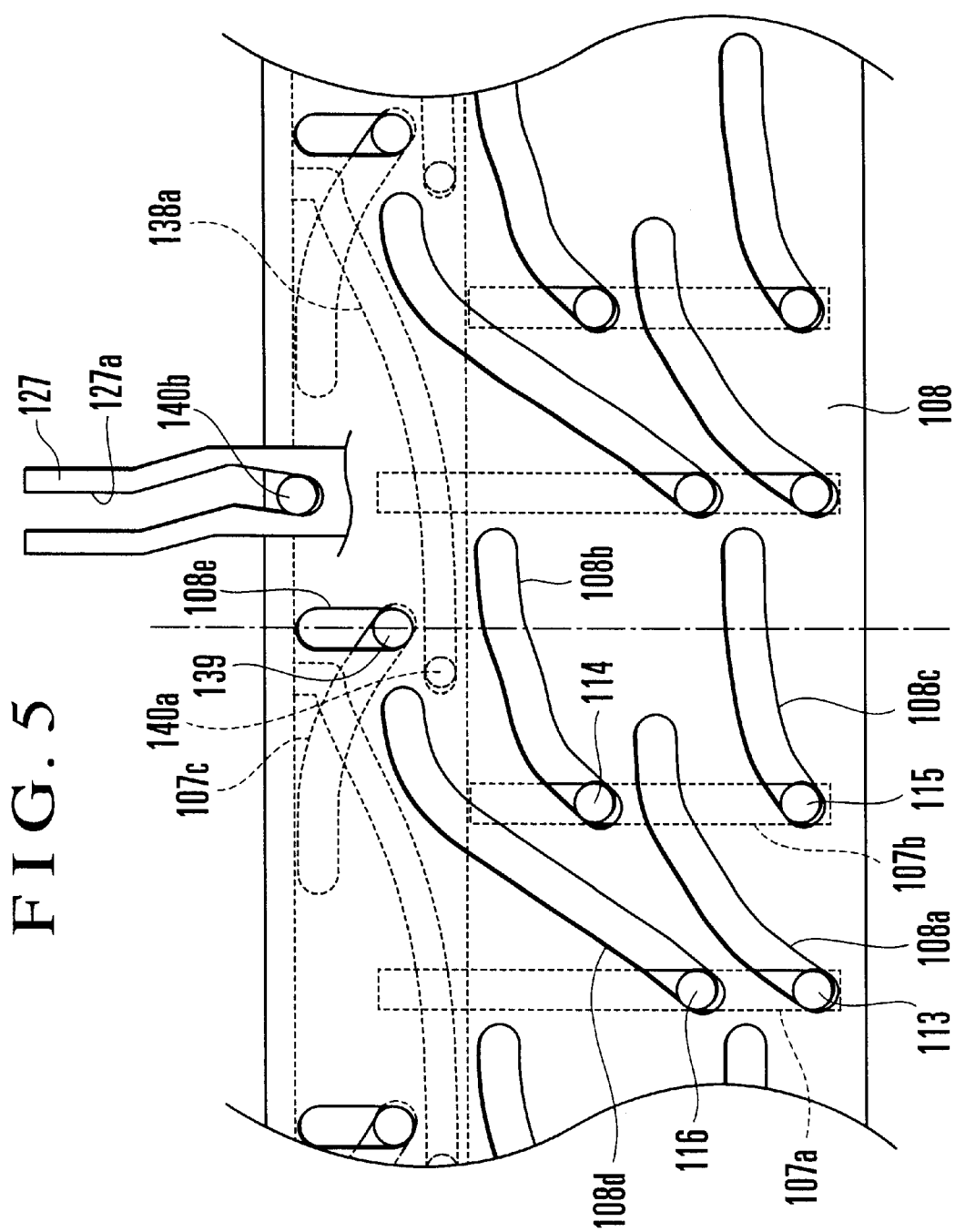

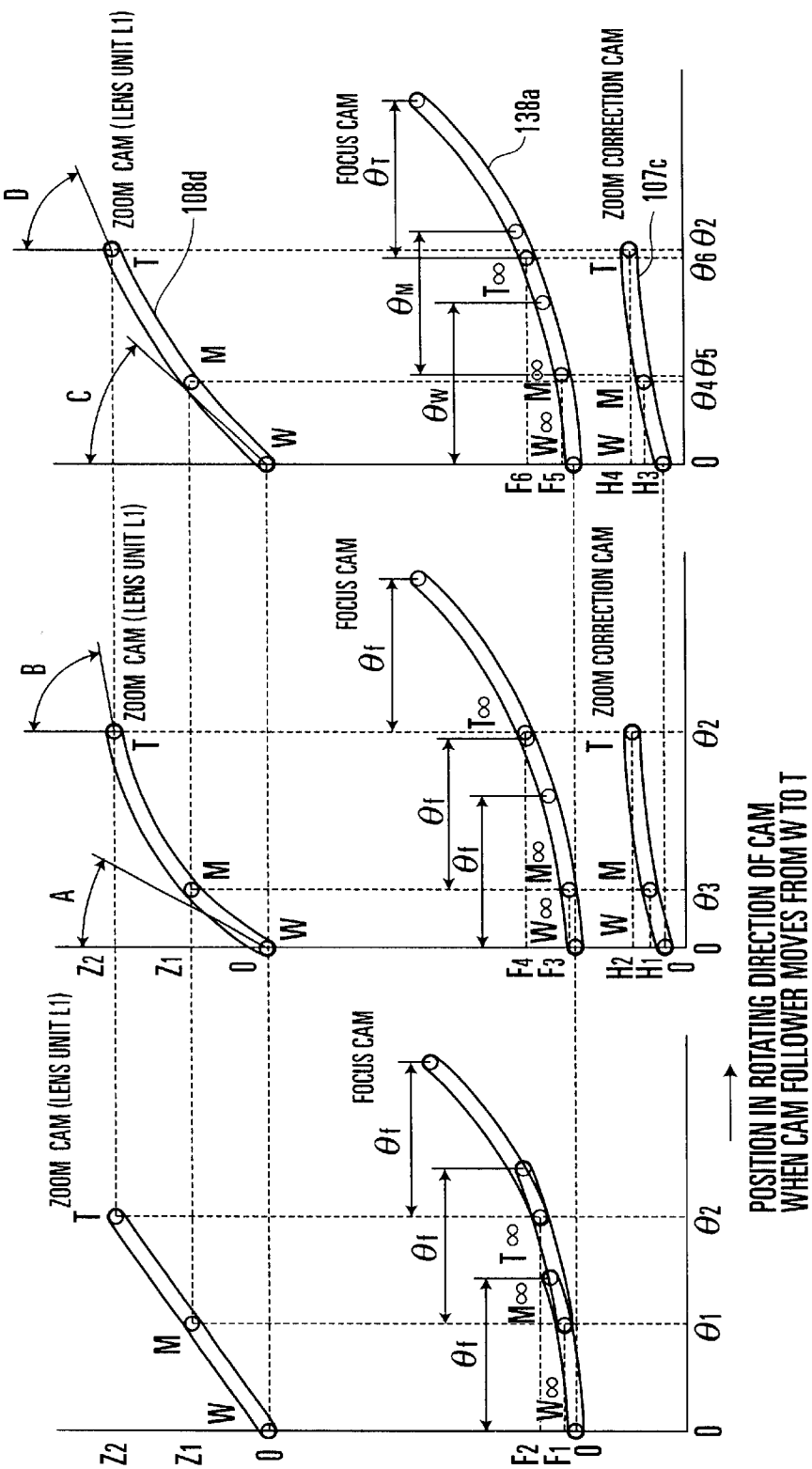

ZOOM LENS BARREL

BACKGROUND OF THE INVENTION

1. Field of the Invention

The present invention relates to a zoom lens barrel (zoom lens apparatus) in which a focusing lens is moved in association with the movement of a variator lens.

2. Description of Related Art

In zoom lens barrels in recent years, a type in which focusing is performed by moving a lens unit other than a front lens unit, which is called an inner focus type or a rear focus type (referred to as an inner focus type below), has been a mainstream in order to achieve the miniaturization of the lens barrel by reducing the diameter of the front lens unit on the object side, to speed up an automatic focusing operation (referred to as an AF below) by making the focusing lens lighter, and to improve the operability of a filter and the hood effect by arranging the front lens unit to have a non-rotary structure.

However, in a zoom lens barrel of such a type, in general, the amount of movement of the focusing lens must be varied in accordance with the variation of the focal length due to the zooming operation. As a method for this purpose, a structure for automatically correcting the amount of movement of the focusing lens according to the variation of the focal length is disclosed in Japanese Patent No. 2561350, for example.

However, according to an increase of the zoom ratio, which is another tendency in recent years, the following problems have been actualized.

In an ordinary zoom lens barrel of the inner focus type, the amount of movement of the focusing lens with respect to the same object distance increases gradually as the zooming proceeds from the wide-angle side toward the telephoto side. In particular, in a zoom lens barrel having a high zoom ratio (generally, a zoom lens barrel having a zoom ratio of 5× or more), the difference in the amount of movement of the focusing lens between the wide-angle side and the telephoto side is large, and the amount of movement of the focusing lens rapidly increases as the zooming approaches the telephoto side.

If the above-mentioned conventional method is applied to the high-zoom-ratio zoom lens barrel having such characteristics, the amount of shift of zoom parameters caused by the optimization of a focus cam, that is, the operation of forming one smooth cam by joining together loci of the amounts of movement of the focusing lens in the respective focal lengths is increased, and, therefore, the inclination of the locus of movement of the variator lens becomes greatly different between the wide-angle side and the telephoto side.

Then, as a result, problems have arisen, such as an operability problem that operational torque is increased and changes rapidly during the zooming operation, and a problem that changes in focus have to be permitted during the zooming operation across the permissible range for solving the former problem.

BRIEF SUMMARY OF THE INVENTION

It is an object of the present invention to provide a zoom lens apparatus capable of restraining changes in focus during the zooming operation to have a sufficiently small value without having a bad influence upon the operability during the zooming operation. In particular, it is another object of the present invention to provide a zoom lens apparatus having small changes in the operational torque during the zooming operation.

In accordance with an aspect of the present invention, there is provided a zoom lens apparatus having an optical axis, comprising a zoom cam tube arranged to rotate around the optical axis and having a cam groove for moving a variator lens along the optical axis, and a focus cam tube having a cam groove for moving a focusing lens along the optical axis, wherein the focus cam tube rotates around the optical axis and moves along the optical axis in association with the rotation of the zoom cam tube during zooming, and wherein a rotational speed of the zoom cam tube and a rotational speed of the focus cam tube during zooming are different from each other.

In particular, the rotational speed of the focus cam tube during zooming becomes lower on a wide-angle side and higher on a telephoto side as compared with the rotational speed of the zoom cam tube.

In particular, the zoom lens apparatus further comprises a zoom operation ring for driving the variator lens, wherein the zoom cam tube rotates around the optical axis according to an operation of the zoom operation ring.

In particular, the zoom lens apparatus further comprises a fixed tube having a straight groove extending along the optical axis, wherein a cam follower provided on the variator lens engages the straight groove of the fixed tube and the cam groove of the zoom cam tube.

In particular, the fixed tube further has a curved groove formed thereon, the zoom cam tube further has a curved groove formed thereon, and the focus cam tube has a cam follower engaging the curved groove of the fixed tube and the curved groove of the zoom cam tube.

In particular, the zoom lens apparatus further comprises an operation ring for driving the focusing lens, wherein the focusing lens moves along the cam groove of the focus cam tube while rotating around the optical axis according to an operation of the operation ring.

In particular, the focusing lens has a cam follower engaging the cam groove of the focus cam tube, and a long groove part extending along the optical axis, which the cam follower of the focusing lens engages, is connected to the operation ring.

In accordance with another aspect of the present invention, there is provided a zoom lens apparatus having an optical axis, comprising a zoom cam tube arranged to rotate around the optical axis and having a cam groove for moving a variator lens along the optical axis, and a focus cam tube having a cam groove for moving a focusing lens along the optical axis, wherein the focus cam tube rotates around the optical axis and moves along the optical axis in association with the rotation of the zoom cam tube during zooming, and wherein, while the focusing lens rotates around the optical axis during zooming, a rotational speed of the zoom cam tube and a rotational speed of the focusing lens are different from each other.

These and further objects, features and advantages of the present invention will become apparent from the following detailed description of preferred embodiments thereof taken in conjunction with the accompanying drawings.

BRIEF DESCRIPTION OF THE SEVERAL VIEWS OF THE DRAWING

FIG. 5 is a development view of a cam tube on the wide-angle side of the interchangeable lens shown in FIG. 4.

FIGS. 6(a), 6(b) and 6(c) are comparative representations of the optimization of a focus cam between the interchangeable lens shown in FIG. 4 and a conventional zoom lens barrel.

DETAILED DESCRIPTION OF THE INVENTION

Hereinafter, preferred embodiments of the present invention will be described in detail with reference to the drawings.

Figure 1:
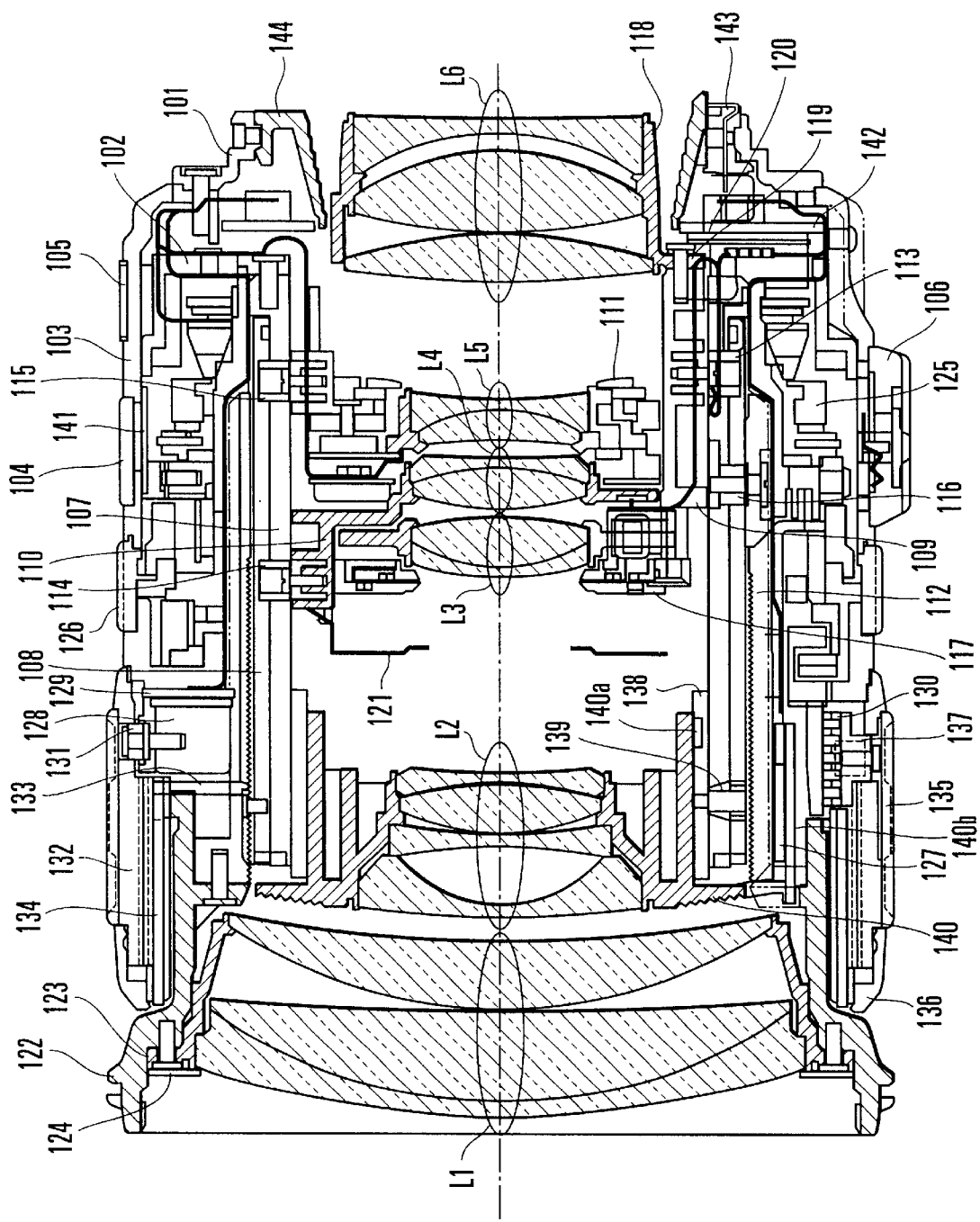
FIG. 1 is a sectional view of an interchangeable lens for a single-lens reflex camera according to a first embodiment of the present invention.
Figure 2:
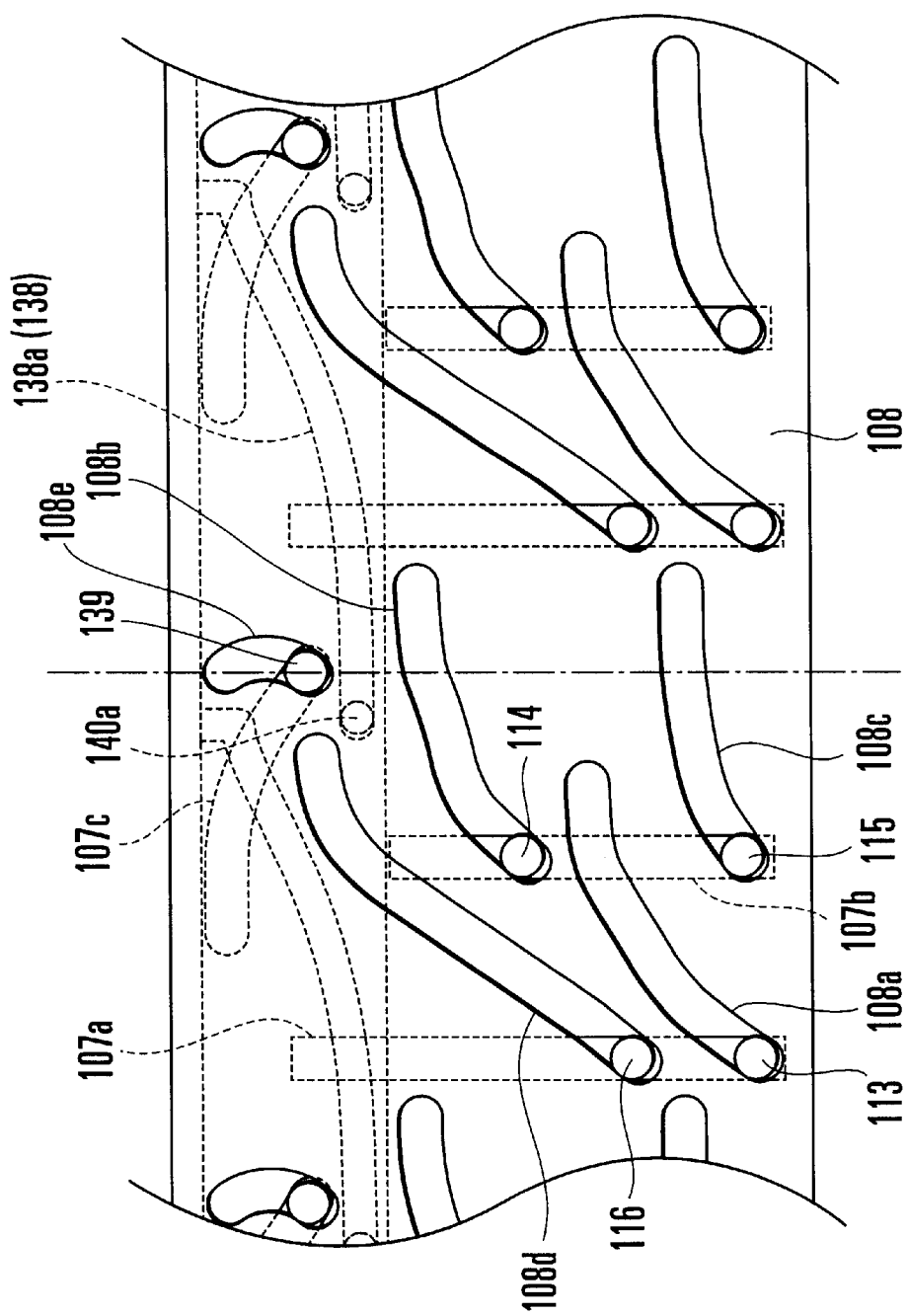
FIG. 2 is a development view of a cam tube on the wide-angle side of the interchangeable lens shown in FIG. 1.

FIG. 1 shows the structure of an interchangeable lens (zoom lens apparatus) for a single-lens reflex camera (optical apparatus) according to a first embodiment of the present invention, and FIG. 2 is a development view of a cam tube on the wide-angle side of the interchangeable lens shown in FIG. 1.

The interchangeable lens has the six-unit structure composed of lens units L1 to L6, and all the lens units L1 to L6 are moved along the optical axis by the zooming operation, while the lens unit L2 is moved along the optical axis by the focusing operation. Then, the lens units L3 and L6 are moved integrally with each other. On the other hand, the lens unit L5 can also be moved in the direction substantially perpendicular to the optical axis so as to perform an image-shake correction, as well as along the optical axis. That is, the interchangeable lens also has an image stabilizing function.

A mount 101 having a bayonet-coupling portion for attaching the interchangeable lens to a camera body (not shown) is fixed to a fixed tube 102 with screws. An armoring ring 103 is sandwiched between the mount 101 and the fixed tube 102 and fixed thereto. The armoring ring 103 is provided with a scale window 104, a nameplate 105 and a switch panel 106, which are attached thereto. Functions, such as the AF system and the image-shake correction, are selected and performed by switching a switch disposed on the switch panel 106.

A guide tube 107 serves as a fixed portion relative to the camera body by being fixed to the fixed tube 102 with screws. The guide tube 107 is fitted into a zoom cam tube 108 which is rotatable only around the optical axis by the bayonet coupling. According to the rotation of the zoom cam tube 108, points of intersection between guide grooves 107a and 107b formed on the guide tube 107 along the optical axial and zoom cams 108a, 108b, 108c and 108d formed on the zoom cam tube 108 are moved, so that an L3-holding frame 109, an L4-holding frame 110, an image-shake correction unit 111 and a rectilinear motion tube 112 can be moved along the optical axial via rollers (cam followers) 113 to 116 respectively fixed thereto with screws.

The L3-holding frame 109 holds the lens unit L3 and is provided with an electromagnetic diaphragm unit 117 (composed of a diaphragm driving portion and a diaphragm blade portion) fixed thereto with screws. At the rear end of the L3-holding frame 109, an L6-holding frame 118 for holding the lens unit L6 is fixed together with a reinforcing plate 119 and a spring washer 120 with screws.

The L4-holding frame 110 holds the lens unit L4 and has a hook portion as well at the front end. To the hook portion, a moving diaphragm 121 is elastically connected from the front, which is used for determining a full aperture and for blocking harmful light. Thereby, the moving diaphragm 121 and the L4-holding frame 110 are easily coupled together while sandwiching the L3-holding frame 109 therebetween.

The image-shake correction unit 111 holds the lens unit L5 in such a way as to be movable in the direction substantially perpendicular to the optical axis, and can move the lens unit L5 by a driving portion composed of a magnet and a coil.

The rectilinear motion tube 112 is provided with a filter frame 122 fixed thereto with screws. On the external circumference at the fore end of the filter frame 122, the bayonet-coupling portion is provided and a thread portion is formed on the internal circumference thereof so as to be capable of respectively placing accessories such as a hood and a filter thereon.

To the filter frame 122, an L1-holding frame 123 for holding the lens unit L1 is attached with screws. The abutting surface between the filter frame 122 and the L1-holding frame 123 is peripherally inclined, so that the installation position of the L1-holding frame 123 in the optical axis direction can be changed by rotating the L1-holding frame 123 to be attached. Accordingly, any discrepancy in the position of focus between the wide-angle side and the telephoto side due to manufacturing errors can be corrected.

On the front face of a dressed ring 124, an indication such as a lens name is printed. A focus-driving unit 125 is attached to the fixed guide tube 107 with screws. The focus-driving unit 125 is mainly composed of a vibration-type motor and a differential mechanism, and outputs the amount of revolution of a focus key 127 corresponding to the amount of rotation of the rotor of the vibration-type motor and the amount of rotation of a manual focusing ring 126. In the front of the focus-driving unit 125, a gyroscopic circuit board 129 is attached via a rubber damper (not shown) with screws. To the gyroscopic circuit board 129, a pair of vibration gyroscopes 128 for detecting angular velocities of vibrations in the horizontal direction and the vertical direction are soldered.

On the external circumference of a protruding portion which extends circularly from the focus-driving unit 125, there is bonded an encoder flexible circuit board 130 on which a Gray code pattern is formed. Furthermore, a protruding portion is disposed in the front of the focus-driving unit 125 out of phase with the vibration gyroscopes 128 and the encoder flexible circuit board 130, and a roller 131 (cam follower) is attached to the protruding portion with a screw.

The roller 131 engages a groove formed on a zoom operation ring 132 in the circumferential direction thereof, so that the movement of the zoom operation ring 132 in the optical axis direction is prevented, and only the rotation of the zoom operation ring 132 around the optical axis is possible. On the internal circumference of the zoom operation ring 132, there is formed a concave portion which is engaged with a zoom key 133 attached to the zoom cam tube 108 with screws, so that the zoom cam tube 108 can be rotated integrally with the rotation of the zoom operation ring 132 via the zoom key 133.

On the external circumference of an intermediate tube 134, there is formed a projection which engages a groove formed on the internal circumference of the zoom operation ring 132 and extending in the optical axis direction, while on the internal circumference of the intermediate tube 134, there is formed a lead groove which is engaged with a projection formed on the external circumference of the filter frame 122. Thereby, the intermediate tube 134 is rotated integrally with the zoom operation ring 132 in the rotating direction, and is made to move back and forth in the optical axis direction according to the position of the zoom operation ring 132 in the rotating direction and the position of the filter frame 122 in the optical axis direction.

In the first embodiment, the vibration gyroscopes 128 are disposed at a position separate from the camera body (in front of the focus-driving unit 125), so that vibrations produced by the operations of shutter blades, the vertical movement of a mirror, and so forth, in the camera body are not easily transmitted to the vibration gyroscopes 128, thereby eliminating such a conventional method that the gyroscopes are stowed within a case. Further, the stopping portion for preventing the movement of the zoom operation ring 132 in the optical axis direction is arranged out of phase with the vibration gyroscopes 128, so that the vibration gyroscopes can be disposed without enlarging the external diameter of the lens barrel. owing to these methods, the reduction in size of the interchangeable lens according to the first embodiment is achieved.

A zoom rubber 135 is wound around the external circumference of the zoom operation ring 132, and a name ring 136 is elastically coupled to the front end part of the zoom operation ring 132. A zoom brush 137 fixed to the zoom operation ring 132 with screws is arranged to slide on the Gray code pattern of the encoder flexible circuit board 130 according to the rotation of the zoom operation ring 132 so as to detect the relative positional relationship between the zoom operation ring 132 and the encoder flexible circuit board 130.

By the rotation of the zoom cam tube 108, an inner cam tube 138 (focus cam tube) moves back and forth in the optical axis direction while rotating via a roller 139 (cam follower) attached thereto with a screw interposing a coil spring therebetween, according to the movement of the intersection point between a zoom correction cam 107c formed on the guide tube 107 and a speed-change cam 108e formed on the zoom cam tube 108.

An L2-holding frame 140 holds the lens unit L2, and a roller part 140a provided on the external circumference portion of the L2-holding frame 140 engages a focus cam 138a formed on the internal circumference of the inner cam tube 138. Further, a key part 140b extending from the L2-holding frame 140 engages the focus key 127, so that, in the rotating direction, the L2-holding frame 140 is arranged to be integral with the focus key 127.

Accordingly, when the zoom cam tube 108 rotates (at this time, the focus key 127 is stopped), the L2-holding frame 140 moves in the optical axis direction by the sum of the amount of movement in the optical axis direction of the inner cam tube 138 due to the movement of the intersection point between the zoom correction cam 107c formed on the guide tube 107 and the speed-change cam 108e formed on the zoom cam tube 108, and the amount of movement in the optical axis direction of the engaging point between the roller part 140a and the focus cam 138a of the inner cam tube 138.

On the other hand, when the focus key 127 rotates (at this time, the zoom cam tube 108 is stopped), the L2-holding frame 140 moves in the optical axis direction while rotating according to the amount of movement in the optical axis direction of the engaging point between the roller part 140a and the focus cam 138a of the inner cam tube 138.

A scale sheet 141 is rotated integrally with the rotation of the focus key 127, which is the output of the focus-driving unit 125, so as to indicate the position of focus together with the scale window 104.

A main circuit board 142 is electrically connected to the focus-driving unit 125, the electromagnetic diaphragm unit 117, the image-shake correction unit 111, the gyroscopic circuit board 129 and the encoder flexible circuit board 130 via a flexible circuit board or directly so as to perform various control operations.

A contact block 143 attached to the mount 101 with screws and connected to the main circuit board 142 via a flexible circuit board communicates with the camera body and receives the supply of electric power. A back lid 144 is elastically coupled to the mount 101 so as to block harmful light.

The structure of the interchangeable lens according to the first embodiment has been described as above, and in summary, the following various operations can be performed.

In the focusing operation, the L2-holding frame 140 is rotated via the focus key 127 by the driving force of the vibration-type motor during automatic focusing, while the L2-holding frame 140 is rotated via the focus key 127 by the rotational operating force of the manual focusing ring 126 during manual focusing. Thereby, the lens unit L2 moves back or forth by the amount of movement in the optical axis direction of the engaging point between the roller part 140a of the L2-holding frame 140 and the focus cam 138a of the inner cam tube 138.

On the other hand, in the zooming operation, when the zoom operation ring 132 is rotated, the zoom cam tube 108 rotates via the zoom key 133. Thereby, the L3-holding frame 109, the L4-holding frame 110, the image-shake correction unit 111 and the rectilinear motion tube 112 are moved in the optical axis direction according to the movement of intersection points between the guide grooves 107a and 107b of the guide tube 107 and the zoom cams 108a, 108b, 108c and 108d of the zoom cam tube 108, so that the lens units L1, L3, L4, L5 and L6 (the lens unit L6 being integral with the lens unit L3) respectively move in the optical axis direction. Simultaneously, the lens unit L2 moves in the optical axis direction by the sum of the amount of movement in the optical axis direction of the inner cam tube 138 due to the movement of the intersection point between the zoom correction cam 107c formed on the guide tube 107 and the speed-change cam 108e formed on the zoom cam tube 108, and the amount of movement in the optical axis direction, caused by the rotation of the inner cam tube 138, of the engaging point between the roller part 140a of the L2-holding frame 140 and the focus cam 138a of the inner cam tube 138. In the first embodiment, owing to the above-mentioned mechanism, it is possible to move the lens unit L2 while correcting the amount of movement of focus caused by changes in the focal length in the inner focus type.

Further, in the image-shake correcting operation, the image-shake correction unit 111 is controlled according to outputs of the vibration gyroscopes 128 and the encoder flexible circuit board 130, so that the lens unit L5 can be driven on the plane approximately perpendicular to the optical axis in such a direction as to cancel the shift of an image on a film surface due to the produced vibration.

Figure 3:
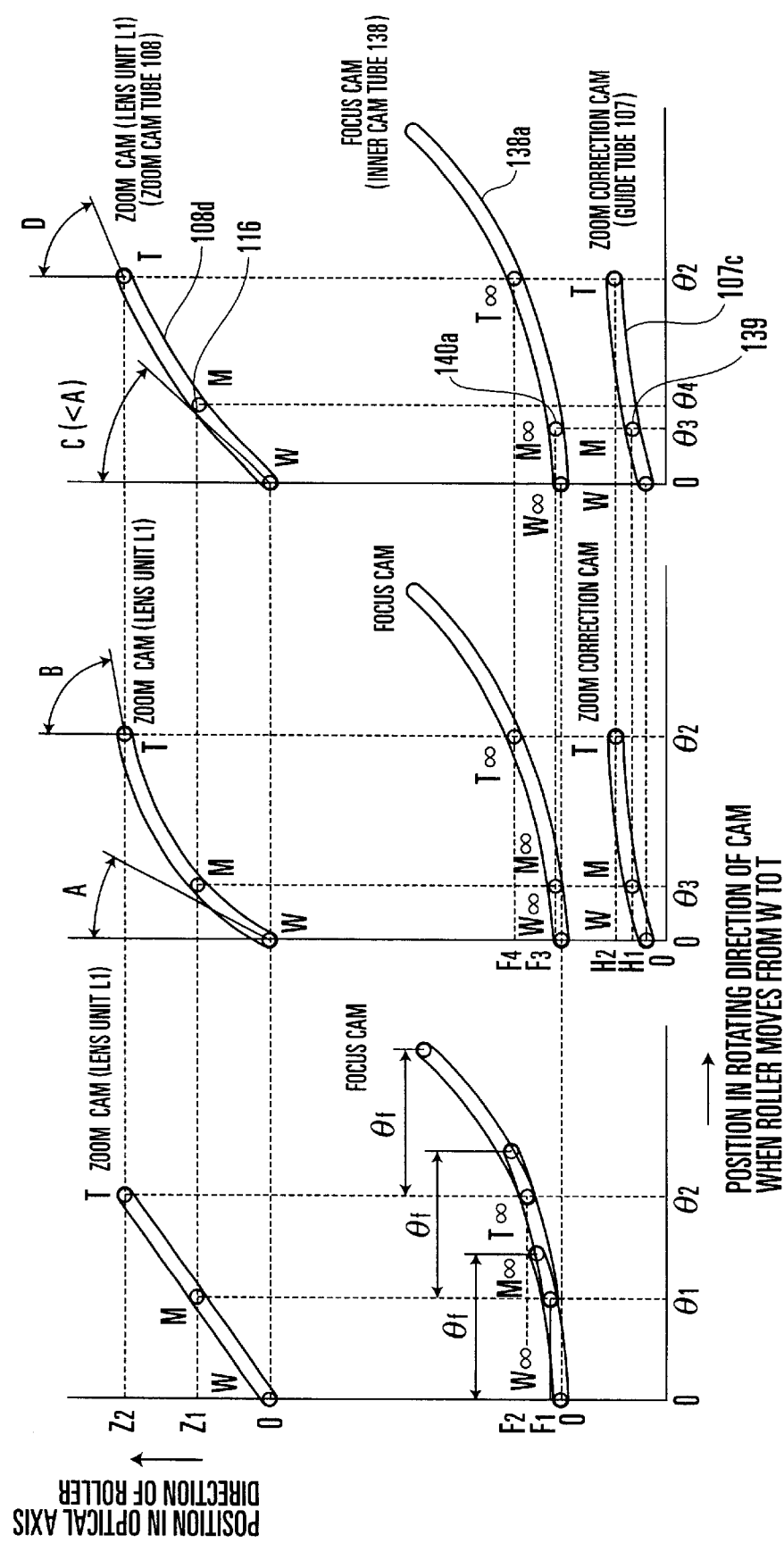
FIGS. 3(a), 3(b) and 3(c) are comparative representations of the optimization of a focus cam between the interchangeable lens shown in FIG. 1 and a conventional zoom lens barrel.

Next, the optimization of the focus cam in the cam driving portion of the interchangeable lens will be described in detail with reference to FIGS. 3(a) to 3(c). FIGS. 3(a) to 3(c) show comparative representations of the optimization of the focus cam between the first embodiment and a conventional example, wherein FIG. 3(a) shows the state of original optical design values, FIG. 3(b) shows the state of the optimization of the focus cam in the conventional example, and FIG. 3(c) shows the state of the optimization of the focus cam in the first embodiment.

In each of the state diagrams of FIGS. 3(a) to 3(c), the abscissa shows the position in the rotating direction of each cam, so that the moving direction of the roller within each cam follows the order, from the left side, of a wide-angle position (W), a middle position (M) and a telephoto position (T), and the ordinate shows the position in the optical axis direction of the roller. A zoom cam, a focus cam and a zoom correction cam correspond to the zoom cam 108d, the focus cam 138a and the zoom correction cam 107c shown in FIG. 2, respectively. The state in which the object distance is ∞ at the position W is defined as the reference (0) of the position in the rotating direction of each cam and the position in the optical axis direction of each roller.

In the state of original optical design values shown in FIG. 3(a), the zoom cam for the lens unit L1, which is the variator lens unit, is indicated by a straight line having a constant lead passing the position θ1 in the rotating direction and the position Z1 in the optical axis direction at the position M, and the position θ2 in the rotating direction and the position Z2 in the optical axis direction at the position T.

On the other hand, the focus cam is formed by arranging the locus of the lens positions of the lens unit L2, which is the focusing lens unit, at the respective positions W, M and T, corresponding to the object distance, in one curved line, so that at the same position in the rotating direction as each of the positions W, M and T in the zoom cam, the object distance is to be ∞, and the object distance becomes shorter as the locus approaches the right side as viewed in FIG. 3(a) (the position in the optical axis direction is F1 at the position M∞, and the position in the optical axis direction is F2 at the position T∞). At this time, in the lens position curve in each focal length, if the rotating angle from the object distance ∞ is the same, the corresponding object distance is set to be the same, and the rotating angle to the minimum object distance is set to be θf for each focal length. However, the focus cam in this state cannot be said to be one smooth curved line.

On the other hand, in the optimization of the conventional focus cam shown in FIG. 3(b), the focus cam is formed into a smooth curved line by shifting the lens position in each of the positions M and T while the rotating angle from the object distance ∞ and the lens moving locus of the lens unit L2 in each focal length remain unchanged with respect to the state shown in FIG. 3(a) (at the position M∞, the position in the rotating direction is θ3 and the position in the optical axis direction is F3; at the position T∞, the position in the rotating direction is θ2 and the position in the optical axis direction is F4). At the same time, the position in the rotating direction of the zoom cam at the position M is similarly shifted to the position θ3 (while the position in the optical axis direction is not changed). Then, the zoom cam and the focus cam are integrally rotated in the rotating direction during the zooming operation. Accordingly, the deviation of the moving locus of the focusing lens in each focal length from the design values can be limited to a sufficiently small value.

At this time, the zoom correction cam is determined as follows. The lens unit L2 moves by the sum of the amount of movement of the entire focus cams by the zoom correction cam and the amount of movement of the lens unit L2 by the focus cam, as described above. Therefore, when the amount of movement (the position W being used as the reference) of the lens unit L2 in the zooming operation is assumed to be Z'1 at the position M∞ and to be Z'2 at the position T∞, the zoom correction cam may be formed into a curved line passing at a position "H1=Z'1−F3" at the position M and passing a position "H2=Z'2−F4" at the position T. Thereby, not only the shift of focus at the object distance ∞ but also the difference in the amount of the lens movement due to the difference in focal length for all object distances can be mechanically corrected (because, if the rotating angle from the object distance ∞ is the same, the object distance is also the same in the usable region of the focus cam in each focal length).

In the conventional example, the amount of movement of the focusing lens associated with changes in the focal length is corrected by the cam construction as described above. However, as mentioned in the foregoing, especially in the case of a zoom lens having a high zoom ratio (generally, a zoom lens apparatus having a zoom ratio of 5× or more), as shown in FIG. 3(b), the required amount of shift of the position in the rotating direction of the zoom cam at the position M is large, and, as a result, inclinations of the zoom cam at the positions W and T are made greatly different from each other (B>A). As a consequence, problems have arisen, such as an operability problem that operational torque is increased and changes rapidly during the zooming operation, and a problem that changes in focus have to be permitted during the zooming operation across the permissible range for solving the former problem.

In contrast, in the optimization of the focus cam according to the first embodiment shown in FIG. 3(c), while the focus cam 138a and the zoom correction cam 107c remain unchanged with respect to those shown in FIG. 3(b), the position in the rotating direction of the zoom cam 108d at the position M is made to be a position θ4 (θ4>θ3), so that the rotational speed of the focus cam 138a (the inner cam tube 138) (and the rotational speed of the roller 139 engaged with the zoom correction cam 107c) relative to the rotational speed of the zoom cam 108d (the zoom cam tube 108) during the zooming operation is changed to be lower (decelerated) at the area from the position W to the position M, and to be higher (accelerated) at the area from the position M to the position T. Furthermore, the total amount of rotation of the zoom cam 108d from the wide-angle end to the telephoto end is made equal to the total amount of rotation of the focus cam 138a (and the total amount of rotation of the roller 139 engaged with the zoom correction cam 107c).

More specifically, by forming the speed-change cam 108e shown in FIG. 2 on the zoom cam tube 108, the discrepancy in the position in the rotating direction between the position of the focus cam (θ3) and the position of the zoom cam (θ4) used at the position M is corrected.

By this arrangement, similarly to the conventional example, the deviation of the moving locus of the focusing lens in each focal length from the design values can be limited to a sufficiently small value, and the difference between inclinations of the cam at the positions W and T, which is a problem in the conventional example, can be resolved (D−C<B−A). Therefore, changes in the operational torque during the zooming operation from the wide-angle end to the telephoto end are reduced, and a focus cam having substantially ideal design values of the focusing lens can be obtained as well.

As described above, in the first embodiment, by changing the rotational speed of the focus cam 138a relative to the rotational speed of the zoom cam 108d during the zooming operation, the effect on the moving locus of the zoom cam 108d due to the optimization of the focus cam is lessened.

In addition, the mechanism for changing the rotational speed of the focus cam 138a relative to the rotational speed of the zoom cam 108d while moving the focus cam 138a in the optical axis direction is formed by bringing the roller 139 attached to the inner cam tube 138 into engagement with both the speed-change cam 108e of the zoom cam tube 108 and the zoom correction cam 107c of the guide tube 107. Therefore, by such a simple structure, the effect on the moving locus of the zoom cam due to the optimization of the focus cam can be lessened.

Furthermore, since the rotational speed of the focus cam 138a relative to the rotational speed of the zoom cam 108d is changed to be lower on the wide-angle side and to be higher on the telephoto side, the effect on the moving locus of the zoom cam due to characteristics of the ordinary zoom lens having a high zoom ratio (i.e., the difference of the amount of movement of the focusing lens between the wide-angle side and the telephoto side is large and the amount of movement rapidly increases as approaching the telephoto side) in the optimization of the focus cam can be lessened.

Furthermore, since the total amount of rotation of the zoom cam 108d from the wide-angle end to the telephoto end is made equal to the total amount of rotation of the focus cam 138a (and the total amount of rotation of the roller 139 engaged with the zoom correction cam 107c), the effect on the moving locus of the variator lens due to the optimization of the focus cam can be lessened while the optimized shape of the conventional focus cam remains unchanged, i.e., without complicating the process for the optimization of the focus cam.

Incidentally, in the first embodiment, the zoom lens apparatus having six lens units has been described. However, the present invention may be applied to a zoom lens apparatus having any number of lens units other than six lens units.

Further, in the first embodiment described above, the movement of the use position of the focus cam when the focal length is changed from the wide-angle side to the telephoto side is made to be the same as that when the object distance is changed from the infinity distance side to the minimum object distance side. However, the present invention is not limited to this arrangement, but may be applied to the combination of the opposite directions.

Further, in the first embodiment described above, during the zooming operation, the zoom cam tube 108 is rotated and the inner cam tube 138 is rotated by the zoom cam tube 108. However, the present invention may also be applied to the case where, during the zooming operation, the focus cam tube is rotated and the zoom cam tube is rotated by the focus cam tube.

Furthermore, the master-and-servant relationship between the cam and the cam follower may be reversed from that in the first embodiment (for example, a focus cam having the shape reversed from the focus cam 138a is formed in the L2-holding frame 140, and a roller engaging such a focus cam is provided in the inner cam tube 138, so that the L2-holding frame 140 moves, while rotating, for focusing with the same locus as that in FIG. 1 by using the roller as a supporting point).

Also, in the first embodiment, the interchangeable lens for a single-lens reflex camera has been described. However, the present invention may be applied to various zoom lens apparatuses and optical apparatuses having such a structure that the focusing lens is moved in association with the movement of the variator lens.

As described above, according to the first embodiment, one of the zoom cam tube and the focus cam tube is provided with a cam-interlocking portion for rotating and driving the other cam tube while changing the rotational speed of the other cam tube relative to the rotational speed of the one cam tube during the zooming operation. Therefore, both the cam tubes can be non-integrally moved in such a manner that, on the wide-angle side, the rotational speed of the focus cam tube relative to the zoom cam tube is reduced and, on the telephoto side, the rotational speed of the focus cam tube relative to the zoom cam tube is increased.

Therefore, when the focus cam formed on the focus cam tube is optimized, the effect thereof on the moving locus of the variator lens can be lessened, and the changes in focus during the zooming operation can be limited to a sufficiently small value without having a bad influence on the operability of the zooming operation.

In addition, by equalizing the amounts of rotation from the wide-angle end to the telephoto end of both the cam tubes with each other, it is possible to prevent the process for the optimization of the focus cam from being complicated.

Also, if a cam-tube-interlocking portion is formed by a cam, a cam for moving the above-mentioned other cam tube in the optical axis direction is formed in a fixed portion, and a cam follower being engaged with both the cams is provided in the other cam tube, the structure of the zoom lens apparatus can be simplified.

Next, another embodiment of the present invention capable of obtaining the same effect as that of the first embodiment by adopting a different structure will be described below. Although there may be overlapping description, the basic structure of a lens barrel will be described.

Figure 4:
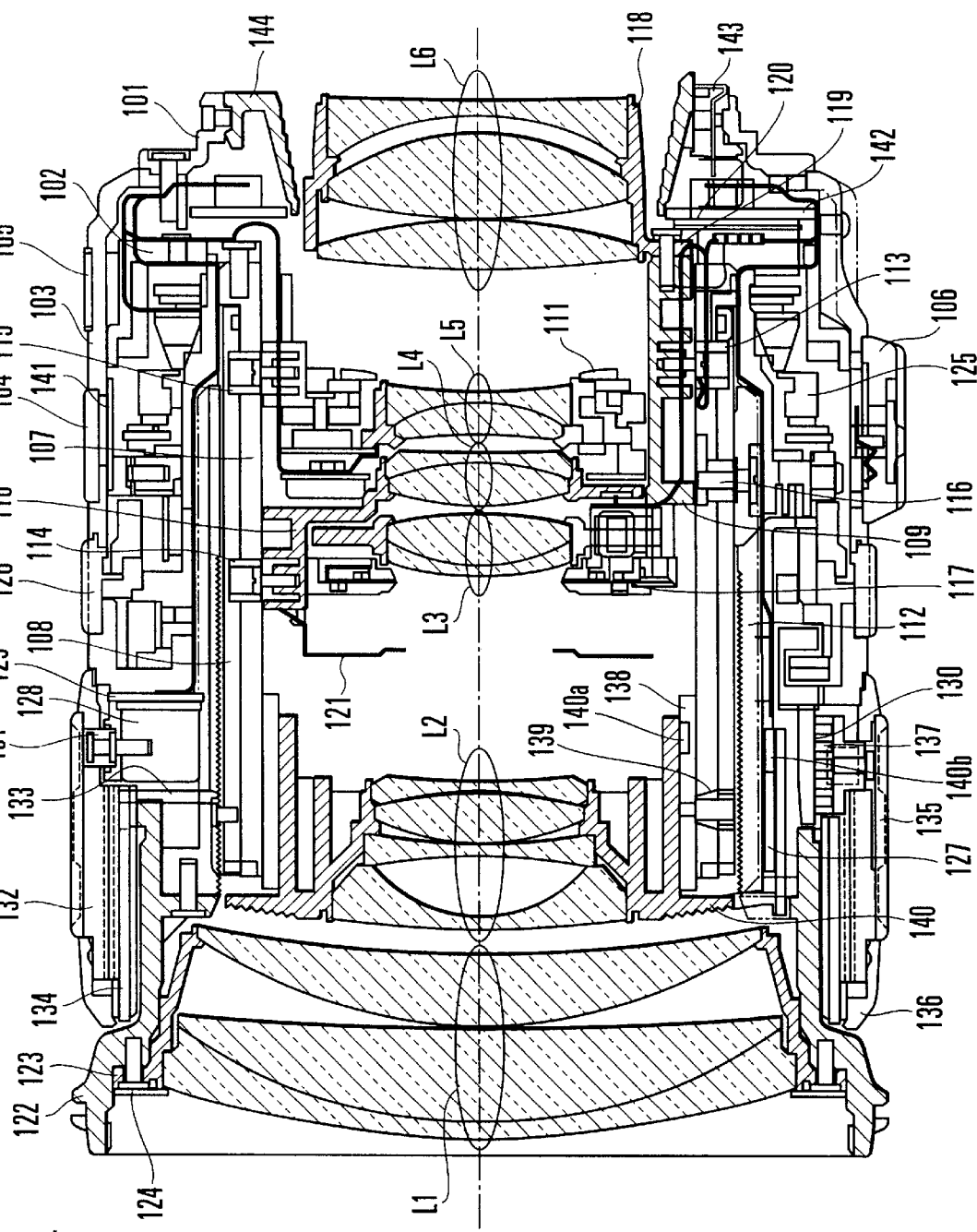
FIG. 4 is a sectional view of an interchangeable lens for a single-lens reflex camera according to a second embodiment of the present invention.

FIG. 4 shows the structure of an interchangeable lens (zoom lens apparatus) for a single-lens reflex camera (optical apparatus) according to the second embodiment of the present invention, and FIG. 5 is a development view of a cam tube on the wide-angle side of the interchangeable lens shown in FIG. 4.

The interchangeable lens according to the second embodiment has the six-unit structure composed of lens units L1 to L6, and all the lens units L1 to L6 are moved along the optical axis by the zooming operation, while the lens unit L2 is moved along the optical axis by the focusing operation. Then, the lens units L3 and L6 are moved integrally with each other. On the other hand, the lens unit L5 can also be moved in the direction substantially perpendicular to the optical axis so as to perform an image-shake correction, as well as along the optical axis. That is, the interchangeable lens also has an image stabilizing function.

A mount 101 having a bayonet-coupling portion for attaching the interchangeable lens to a camera body (not shown) is fixed to a fixed tube 102 with screws. An armoring ring 103 is sandwiched between the mount 101 and the fixed tube 102 and fixed thereto. The armoring ring 103 is provided with a scale window 104, a nameplate 105 and a switch panel 106, which are attached thereto. Functions, such as the AF system and the image-shake correction, are selected and performed by switching a switch disposed on the switch panel 106.

A guide tube 107 serves as a fixed portion relative to the camera body by being fixed to the fixed tube 102 with screws. The guide tube 107 is fitted into a cam tube 108 which is rotatable only around the optical axis by the bayonet coupling. According to the rotation of the cam tube 108, points of intersection between guide grooves 107a and 107b formed on the guide tube 107 along the optical axial and zoom cams 108a, 108b, 108c and 108d formed on the cam tube 108 are moved, so that an L3-holding frame 109, an L4-holding frame 110, an image-shake correction unit 111 and a rectilinear motion tube 112 can be moved along the optical axial via cam followers 113 to 116 respectively fixed thereto with screws.

The L3-holding frame 109 holds the lens unit L3 and is provided with an electromagnetic diaphragm unit 117 (composed of a diaphragm driving portion and a diaphragm blade portion) fixed thereto with screws. At the rear end of the L3-holding frame 109, an L6-holding frame 118 for holding the lens unit L6 is fixed together with a reinforcing plate 119 and a spring washer 120 with screws.

The L4-holding frame 110 holds the lens unit L4 and has a hook portion as well at the front end. To the hook portion, a moving diaphragm 121 is elastically connected from the front, which is used for determining a full aperture and for blocking harmful light. Thereby, the moving diaphragm 121 and the L4-holding frame 110 are easily coupled together while sandwiching the L3-holding frame 109 therebetween.

The image-shake correction unit 111 holds the lens unit L5 in such a way as to be movable in the direction substantially perpendicular to the optical axis, and can move the lens unit L5 by a driving portion composed of a magnet and a coil.

The rectilinear motion tube 112 is provided with a filter frame 122 fixed thereto with screws. On the external circumference at the fore end of the filter frame 122, the bayonet-coupling portion is provided and a thread portion is formed on the internal circumference thereof so as to be capable of respectively placing accessories such as a hood and a filter thereon.

To the filter frame 122, an L1-holding frame 123 for holding the lens unit L1 is attached with screws. The abutting surface between the filter frame 122 and the L1-holding frame 123 is peripherally inclined, so that the installation position of the L1-holding frame 123 in the optical axis direction can be changed by rotating the L1-holding frame 123 to be attached. Accordingly, any discrepancy in the position of focus between the wide-angle side and the telephoto side due to manufacturing errors can be corrected.

On the front face of a dressed ring 124, an indication such as a lens name is printed. A focus-driving unit 125 is attached to the fixed guide tube 107 with screws. The focus-driving unit 125 is mainly composed of a vibration-type motor and a differential mechanism, and outputs the amount of revolution of a focus key 127 corresponding to the amount of rotation of the rotor of the vibration-type motor and the amount of rotation of a manual focusing ring 126.

In the front of the focus-driving unit 125, a gyroscopic circuit board 129 is attached via a rubber damper (not shown) with screws. To the gyroscopic circuit board 129, a pair of vibration gyroscopes 128 for detecting angular velocities of vibrations in the horizontal direction and the vertical direction are soldered. Further, on the external circumference of a protruding portion which extends circularly from the focus-driving unit 125, there is bonded an encoder flexible circuit board 130 on which a Gray code pattern is formed.

Furthermore, a protruding portion is disposed in the front of the focus-driving unit 125 out of phase with the vibration gyroscopes 128 and the encoder flexible circuit board 130, and a cam follower 131 is attached to the protruding portion with a screw.

The cam follower 131 engages a groove formed on a zoom operation ring 132 in the circumferential direction thereof, so that the movement of the zoom operation ring 132 in the optical axis direction is prevented, and only the rotation of the zoom operation ring 132 around the optical axis is possible.

On the internal circumference of the zoom operation ring 132, there is formed a concave portion which is engaged with a zoom key 133 attached to the cam tube 108 with screws, so that the cam tube 108 can be rotated integrally with the rotation of the zoom operation ring 132 via the zoom key 133.

On the external circumference of an intermediate tube 134, there is formed a projection which engages a groove formed on the internal circumference of the zoom operation ring 132 and extending in the optical axis direction, while on the internal circumference of the intermediate tube 134, there is formed a lead groove which is engaged with a projection formed on the external circumference of the filter frame 122. Thereby, the intermediate tube 134 is rotated integrally with the zoom operation ring 132 in the rotating direction, and is made to move back and forth in the optical axis direction according to the position of the zoom operation ring 132 in the rotating direction and the position of the filter frame 122 in the optical axis direction.

In the second embodiment, the vibration gyroscopes 128 are disposed at a position separate from the camera body (in front of the focus-driving unit 125), so that vibrations produced by the operations of shutter blades, the vertical movement of a mirror, and so forth, in the camera body are not easily transmitted to the vibration gyroscopes 128, thereby eliminating such a conventional method that the gyroscopes are stowed within a case.

Further, the projecting portion for preventing the movement of the zoom operation ring 132 in the optical axis direction is arranged out of phase with the vibration gyroscopes 128, so that the vibration gyroscopes can be disposed without enlarging the external diameter of the lens barrel. Owing to these methods, the reduction in size of the interchangeable lens according to the second embodiment is achieved.

A zoom rubber 135 is wound around the external circumference of the zoom operation ring 132, and a name ring 136 is elastically coupled to the front end part of the zoom operation ring 132. A zoom brush 137 fixed to the zoom operation ring 132 with screws is arranged to slide on the Gray code pattern of the encoder flexible circuit board 130 according to the rotation of the zoom operation ring 132 so as to detect the relative positional relationship between the zoom operation ring 132 and the encoder flexible circuit board 130.

A cam follower 139 is fixed to an inner cam tube 138 (focus cam tube) with a screw while interposing a coil spring therebetween. The cam follower 139 is engaged with a zoom correction cam 107c formed on the guide tube 107 and a rectilinear motion groove part 108e formed on the cam tube 108 in the optical axis direction. Therefore, when the cam tube 108 rotates, the inner cam tube 138 moves back and forth in the optical axis direction according to the movement of the intersection point between the zoom correction cam 107c and the rectilinear motion groove part 108e (i.e., the engaging position of the cam follower 139).

The L2-holding frame 140 holds the lens unit L2. A cam follower part 140a, which is disposed on the external circumference of the L2-holding frame 140, engages a focus cam 138a disposed on the internal circumference of the inner cam tube 138. A key part (key follower) 140b extending from the L2-holding frame 140 engages a key groove part 127a formed in the focus key 127.

Therefore, in the focusing operation, when the vibration-type motor or the manual focusing ring 126 rotates to rotate the focus key 127 (the cam tube 108 being stopped), the rotation of the focus key 127 is transmitted to the L2-holding frame 140 via the key part 140b so as to rotate the L2-holding frame 140. When the L2-holding frame 140 rotates, the L2-holding frame 140 also moves in the optical axis direction according to the amount of movement in the optical axis direction of the engaging point between the cam follower part 140a and the focus cam 138a of the inner cam tube 138.

On the other hand, in the zooming operation, since, while the vibration-type motor, the manual focusing ring 126 and the focus key 127 do not rotate, the cam tube 108 rotates, the L2-holding frame 140 moves in the optical axis direction by the sum of the amount of movement in the optical axis direction of the inner cam tube 138 due to the movement of the intersection point by the rotation of the cam tube 108 between the zoom correction cam 107c of the guide tube 107 and the rectilinear motion groove part 108e of the cam tube 108, and the amount of movement in the optical axis direction of the engaging point between the cam follower part 140a and the focus cam 138a of the inner cam tube 138.

Here, during zooming from the state on the wide-angle side shown in FIG. 5 toward the telephoto side via the middle region, the cam tube 108 and the inner cam tube 138 rotate toward the left as viewed in FIG. 5. Thereby, the L2-holding frame 140 is moved upward (frontward in the optical direction), so that the key part 140b is moved along the key groove part 127a, which is stopped from rotating, from the lower end thereof toward the vicinity of the upper end thereof. When zooming is effected from the telephoto side to the wide-angle side, the cam tube 108 and the inner cam tube 138 rotate to the right as viewed in FIG. 5, and the L2-holding frame 140 is moved downward (rearward in the optical direction) and the key part 140b is moved along the key groove part 127a, which is stopped from rotating, from the vicinity of the upper end thereof toward the lower end thereof.

In the second embodiment, the lower part of the key groove part 127a (i.e., the engaging range of the key part 140b corresponding to the movement range in the wide-angle region of the L2-holding frame 140) slants upwardly to the right as viewed in FIG. 5 relative to the vertical direction, which is the optical axis direction. The intermediate part of the key groove part 127a (i.e., the engaging range of the key part 140b corresponding to the movement range in the middle region of the L2-holding frame 140) slants upwardly to the left as viewed in FIG. 5 relative to the vertical direction, which is the optical axis direction.

Furthermore, the upper part of the key groove part 127a (i.e., the engaging range of the key part 140b corresponding to the movement range in the telephoto region of the L2-holding frame 140) extends straight in the vertical direction, which is the optical axis direction. Thus, at least a part of the key groove part 127a is formed to have a non-straight cam shape which is not parallel with the optical axis direction.

Therefore, during the zooming operation in the telephoto region, by the engaging action between the key part 140b and the upper part of the key groove part 127a, the L2-holding frame 140 remains stationary with respect to the rotation of the cam tube 108 and the inner cam tube 138.

Further, during the zooming operation in the wide-angle region, by the engaging action between the key part 140b and the lower part of the key groove part 127a, the L2-holding frame 140 is rotated in the direction reverse to the direction of rotation of the cam tube 108 and the inner cam tube 138. Thereby, during the zooming operation in the wide-angle region, the relative rotational speed of the L2-holding frame 140 with respect to the cam tube 108 and the inner cam tube 138, that is, the relative rotational speed of the cam follower part 140a within the focus cam 138a, becomes higher than that during the zooming operation in the telephoto region.

Furthermore, during the zooming operation in the middle region, by the engaging action between the key part 140b and the intermediate part of the key groove part 127a, the L2-holding frame 140 is rotated in the same direction as the direction of rotation of the cam tube 108 and the inner cam tube 138. Thereby, during the zooming operation in the middle region, the relative rotational speed of the L2-holding frame 140 with respect to the cam tube 108 and the inner cam tube 138, that is, the relative rotational speed of the cam follower part 140a within the focus cam 138a, becomes lower than that during the zooming operation in the telephoto region.

Referring again to FIG. 4, a scale sheet 141 is rotated integrally with the rotation of the focus key 127, which is the output of the focus-driving unit 125, so as to indicate the position of focus together with the scale window 104.

A main circuit board 142 is electrically connected to the focus-driving unit 125, the electromagnetic diaphragm unit 117, the image-shake correction unit 111, the gyroscopic circuit board 129 and the encoder flexible circuit board 130 via a flexible circuit board or directly so as to perform various control operations.

A contact block 143 attached to the mount 101 with screws and connected to the main circuit board 142 via a flexible circuit board communicates with the camera body and receives the supply of electric power. A back lid 144 is elastically coupled to the mount 101 so as to block harmful light.

The structure of the interchangeable lens according to the second embodiment has been described as above, and in summary, the following various operations can be performed.

In the focusing operation, the L2-holding frame 140 is rotated via the focus key 127 by the driving force of the vibration-type motor during automatic focusing, while the L2-holding frame 140 is rotated via the focus key 127 by the rotational operating force of the manual focusing ring 126 during manual focusing. Thereby, the lens unit L2 moves back or forth by the amount of movement in the optical axis direction of the engaging point between the cam follower part 140a of the L2-holding frame 140 and the focus cam 138a of the inner cam tube 138.

On the other hand, in the zooming operation, when the zoom operation ring 132 is rotated, the cam tube 108 rotates via the zoom key 133. Thereby, the L3-holding frame 109, the L4-holding frame 110, the image-shake correction unit 111 and the rectilinear motion tube 112 are moved in the optical axis direction according to the movement of intersection points between the guide grooves 107a and 107b of the guide tube 107 and the zoom cams 108a, 108b, 108c and 108d of the cam tube 108, so that the lens units L1, L3, L4, L5 and L6 (the lens unit L6 being integral with the lens unit L3) respectively move in the optical axis direction.

Further, at the same time, the lens unit L2 moves in the optical axis direction by the sum of the amount of movement in the optical axis direction of the inner cam tube 138 due to the movement of the intersection point between the zoom correction cam 107c of the guide tube 107 and the rectilinear motion groove part 108e of the cam tube 108, and the amount of movement in the optical axis direction, caused by the rotation of the inner cam tube 138, of the engaging point between the cam follower part 140a of the L2-holding frame 140 and the focus cam 138a of the inner cam tube 138, thereby effecting the correction of focus due to changes in the focal length.

In addition, in the second embodiment, it is possible to move the lens unit L2 while correcting the amount of movement of focus caused by changes in the focal length in the inner focus type, as will be described later.

Further, in the image-shake correcting operation, the image-shake correction unit 111 is controlled according to outputs of the vibration gyroscopes 128 and the encoder flexible circuit board 130, so that the lens unit L5 can be driven on the plane approximately perpendicular to the optical axis in such a direction as to cancel the shift of an image on a film surface due to the produced vibration.

Next, the optimization of the focus cam adopted in the interchangeable lens according to the second embodiment will be described in detail with reference to FIGS. 6(a) to 6(c). FIG. 6(a) shows the state of original optical design values, FIG. 6(b) shows the state of the optimization of the focus cam in the conventional example, and FIG. 6(c) shows the state of the optimization of the focus cam in the second embodiment. In each of the state diagrams of FIGS. 6(a) to 6(c), the abscissa shows the position in the rotating direction of each cam, so that the moving direction of the cam follower within each cam follows the order, from the left side, of a wide-angle position (W), a middle position (M) and a telephoto position (T), and the ordinate shows the position in the optical axis direction of the cam follower.

Further, a zoom cam, a focus cam and a zoom correction cam shown in FIGS. 6(a) and 6(b) correspond to the zoom cam 108d, the focus cam 138a and the zoom correction cam 107c shown in FIG. 6(c) in the second embodiment, respectively. The state in which the object distance is ∞ at the position W is defined as the reference (0) of the position in the rotating direction of each cam and the position in the optical axis direction of each cam follower.

In the state of original optical design values shown in FIG. 6(a), the zoom cam for the lens unit L1, which is the variator lens unit, is indicated by a straight line having a constant lead passing the position θ1 in the rotating direction and the position Z1 in the optical axis direction at the position M, and the position θ2 in the rotating direction and the position Z2 in the optical axis direction at the position T.

On the other hand, the focus cam is formed by arranging the locus of the lens positions of the lens unit L2, which is the focusing lens unit, at the respective positions W, M and T, corresponding to the object distance, in one curved line, so that at the same position in the rotating direction as each of the positions W, M and T in the zoom cam, the object distance is to be ∞, and the object distance becomes shorter as the locus approaches the right side as viewed in FIG. 6(a) (the position in the optical axis direction is F1 at the position M∞, and the position in the optical axis direction is F2 at the position T∞).

At this time, in the lens position curve in each focal length, if the rotating angle from the object distance ∞ is the same, the corresponding object distance is set to be the same, and the rotating angle to the minimum object distance is set to be θf for each focal length. However, the focus cam in this state cannot be said to be one smooth curved line.

On the other hand, in the optimization of the conventional focus cam shown in FIG. 6(b), the focus cam is formed into a smooth curved line by shifting the lens position in each of the positions M and T while the rotating angle from the object distance ∞ and the lens moving locus of the lens unit L2 in each focal length remain unchanged with respect to the state shown in FIG. 6(a) (at the position M∞, the position in the rotating direction is θ3 and the position in the optical axis direction is F3; at the position T∞, the position in the rotating direction is θ2 and the position in the optical axis direction is F4). At the same time, the position in the rotating direction of the zoom cam at the position M is similarly shifted to the position θ3 (while the position in the optical axis direction is not changed). Then, the zoom cam and the focus cam are integrally rotated in the rotating direction during the zooming operation. Accordingly, the deviation of the moving locus of the focusing lens in each focal length from the design values can be limited to a sufficiently small value.

At this time, the zoom correction cam is determined as follows. The lens unit L2 moves by the sum of the amount of movement of the entire focus cams by the zoom correction cam and the amount of movement of the lens unit L2 by the focus cam, as described above. Therefore, when the amount of movement (the position W∞ being used as the reference) of the lens unit L2 in the zooming operation is assumed to be Z'1 at the position M∞ to be Z'2 at the position T∞, the zoom correction cam may be formed into a curved line passing at a position "H1=Z'1−F3" at the position M and passing a position "H2=Z'2−F4" at the position T. Thereby, not only the shift of focus at the object distance ∞ but also the difference in the amount of the lens movement due to the difference in focal length for all object distances can be mechanically corrected (because, if the rotating angle from the object distance ∞ is the same, the object distance is also the same in the usable region of the focus cam in each focal length).

In the conventional example, the amount of movement of the focusing lens associated with changes in the focal length is corrected by the cam construction as described above. However, as mentioned in the foregoing, especially in the case of a zoom lens having a high zoom ratio (generally, a zoom lens apparatus having a zoom ratio of 5× or more), as shown in FIG. 6(b), the required amount of shift of the position in the rotating direction of the zoom cam at the position M is large, and, as a result, inclinations of the zoom cam at the positions W and T are made greatly different from each other (B>A). As a consequence, problems have arisen, such as an operability problem that operational torque is increased and changes rapidly during the zooming operation, and a problem that changes in focus have to be permitted during the zooming operation across the permissible range for solving the former problem.

In contrast, in the optimization of the focus cam according to the second embodiment shown in FIG. 6(c), with respect to the state shown in FIG. 6(b), the position in the rotating direction of the zoom cam 108d at the position M is made to be θ4 (>θ3), and such a mechanism as to change the rotational speed of the cam follower part 140a within the focus cam 138a during the zooming operation according to the position of the lens unit L2 in the optical axis direction (i.e., the focal length)(an engaging mechanism between the key part 140b and the key groove part 127a having a non-straight cam shape) is provided to correct the use position and the working range of the focus cam in each focal length. Thereby, not only the deviation of the moving locus of the focusing lens from the design values can be limited to a sufficiently small value, as in the conventional example, but also the large difference of inclinations of the zoom cam 108*d* between the positions W and T can be resolved (D−C<B−A).

More particularly, the shape of the focus cam 138*a* is arranged so that the lens position at each of the positions M and T is made to be θ5 in the position in the rotating direction and F5 in the position in the optical axis direction at the position M∞, and to be θ6 in the position in the rotating direction and F6 in the position in the optical axis direction at the position T∞. In accordance with the above arrangement, the zoom correction cam 107*c* is also formed into a curved line passing the position "H3=Z'1−F5" at the position M and passing the position "H4=Z'2−F6" at the position T (the position in the rotating direction being the same as in the zoom cam 108*d*). Thereby, not only the shift of focus at the object distance ∞ but also the difference in the amount of the lens movement due to the difference in focal length for all object distances can be mechanically corrected. Thus, the relative rotational speed in the usable region of the focus cam in each focal length is so established that, if the rotating angle of the focus key 127 from the object distance ∞ is the same, the object distance is also the same.

In the second embodiment, since the mechanism for changing the rotating speed of the cam follower part 140*a* within the focus cam 138*a* according to the focal length is formed by using the key groove part 127*a* of the focus key 127 for rotating the lens unit L2 in the focusing operation, the effect on the moving locus of the zoom cam (108*d*, etc.) due to the optimization of the focus cam can be lessened with the existing structural elements used, i.e., without newly providing a complicated mechanism.

In addition, since the object distance in each focal length corresponds to the rotational angle of the focus key 127, an indication mechanism for the scales of the object distance can also be readily formed if the interlocking thereof with the focus key 127 is used.

Further, the rotational speed of the cam follower part 140*a* within the focus cam 138*a* is changed by the inclination of the key groove part 127*a* relative to the optical axis direction in accordance with the position in the optical axis direction (i.e., focal length) of the lens unit L2 so as to have the following relation:

θW>θT>θM

Thereby, the effect on the moving locus of the zoom cam due to the optimization of the focus cam owing to characteristics of the ordinary zoom lens having a high zoom ratio (generally, a zoom lens having a zoom ratio of 5× or more) (when a smooth focus cam with the position T as the reference is considered as shown in FIG. 6(*a*), the amount of movement has such a tendency to be excessively large at the position M and, in contrast, excessively small at the position W) can be lessened.

Furthermore, a moving mechanism for correcting the difference between the focus moving locus and the zoom moving locus of the lens unit L2 is composed of the rectilinear motion groove part 108*e* formed on the cam tube 108 having the zoom cam and the zoom correction cam 107*c*. Thereby, the effect on the moving locus of the zoom cam due to the optimization of the focus cam can be lessened without providing a complicated mechanism.

In addition, in the second embodiment, the zoom lens system having six lens units has been described. However, the present invention may be applied to a zoom lens system having any number of lens units other than six lens units.

Further, in the second embodiment described above, the movement of the use position of the focus cam 138*a* when the focal length is changed from the wide-angle side to the telephoto side is made to be the same as that when the object distance is changed from the infinity distance side to the minimum object distance side. However, the present invention is not limited to this arrangement, but may be applied to the combination of the opposite directions.

Further, the present invention may be applied to the structure disclosed in Japanese Laid-Open Patent Application No. Hei 4-184405, in which the cam tube 108 in the second embodiment is arranged to move with the same locus as that of the inner cam tube 138 while rotating, and the cam tube 108 is combined with the inner cam tube 138 into one piece.

Furthermore, the master-and-servant relationship between the cam and the cam follower may be reversed from that in the second embodiment. For example, a focus cam having the shape reversed from the focus cam 138*a* is formed in the L2-holding frame 140, and a cam follower engaging such a focus cam is provided in the inner cam tube 138, so that the L2-holding frame 140 moves, while rotating, for focusing with the same locus as that in FIG. 4 by using the cam follower as a supporting point. In addition, in this case, a key part engaging the key groove of the focus key may also be provided in the L2-holding frame.

Also, in the second embodiment, the interchangeable lens for a single-lens reflex camera for silver-halide photography has been described. However, the present invention may be applied to various optical apparatuses other than the above-mentioned interchangeable lens, such as lens barrels, lens-integrated cameras for silver-halide photography, digital cameras, and video cameras.

As described above, according to the second embodiment, the moving speed of the engaging point between the focusing drive cam and the cam follower provided in the focusing lens can be changed according to the focal length, so that the engaging position and the engaging range between the focusing drive cam and the cam follower of the focusing lens in each focal length can be simply corrected.

Also, the moving speed of the engaging point between the focusing drive cam provided in the second cam tube holding the focusing lens and the cam follower provided in the first cam tube can be changed according to the focal length, so that the engaging position and the engaging range between the focusing drive cam and the cam follower of the first cam tube in each focal length can be simply corrected.

Accordingly, the effect on the moving locus of the variator lens (i.e., the shape of the variator drive cam) due to the optimization of the focusing drive cam can be lessened, and, thereby, the changes of focus during the zooming operation can be limited to a sufficiently small value without having a bad influence on the operability of the zooming operation.

Then, if the above-mentioned relative rotational speed is varied so as to satisfy the following relation:

the relative rotational speed in the wide-angle region>the relative rotational speed in the telephoto region>the relative rotational speed in the middle region, the deviation of the moving locus of the focusing lens from the design values can be limited to a small value, and the difference of inclinations of the variator drive cam relative to the optical axis direction between the wide-angle region and the telephoto region can be reduced, so that rapid changes in the operational torque from the wide-angle range to the telephoto range are reduced.

Further, in a case where a lens driving device is provided with a key groove part engaged with a cam follower disposed in a focusing lens or a lens holding tube thereof, and a focusing drive member for rotationally driving, by rotation during focusing, the focusing lens or the lens holding tube relative to a cam tube stopped from rotating by the engagement between the key groove and the cam follower, at least a part of the key groove is formed to have a non-straight cam shape which is not parallel with the optical axis direction. Accordingly, a speed change mechanism can be simply formed by using the existing structural elements.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens apparatus having an optical axis, comprising:
   a zoom cam tube arranged to rotate around the optical axis and having a cam groove for moving a variator lens along the optical axis; and
   a focus cam tube having a cam groove for moving a focusing lens along the optical axis,
   wherein said focus cam tube rotates around the optical axis and moves along the optical axis in association with the rotation of said zoom cam tube during zooming, and
   wherein a rotational speed of said zoom cam tube and a rotational speed of said focus cam tube during zooming are different from each other.

2. A zoom lens apparatus according to claim 1, wherein the rotational speed of said focus cam tube during zooming becomes lower on a wide-angle side and higher on a telephoto side as compared with the rotational speed of said zoom cam tube.

3. A zoom lens apparatus according to claim 1, further comprising a zoom operation ring for driving the variator lens, wherein said zoom cam tube rotates around the optical axis according to an operation of said zoom operation ring.

4. A zoom lens apparatus according to claim 1, further comprising a fixed tube having a straight groove extending along the optical axis, wherein a cam follower provided on the variator lens engages the straight groove of said fixed tube and the cam groove of said zoom cam tube.

5. A zoom lens apparatus according to claim 4, wherein said fixed tube further has a curved groove formed thereon, said zoom cam tube further has a curved groove formed thereon, and said focus cam tube has a cam follower engaging the curved groove of said fixed tube and the curved groove of said zoom cam tube.

6. A zoom lens apparatus according to claim 1, further comprising an operation ring for driving the focusing lens, wherein the focusing lens moves along the cam groove of said focus cam tube while rotating around the optical axis according to an operation of said operation ring.

7. A zoom lens apparatus according to claim 6, wherein the focusing lens has a cam follower engaging the cam groove of said focus cam tube, and a long groove part extending along the optical axis, which the cam follower of the focusing lens engages, is connected to said operation ring.

8. A zoom lens apparatus having an optical axis, comprising:
   a zoom cam tube arranged to rotate around the optical axis and having a cam groove for moving a variator lens along the optical axis; and
   a focus cam tube having a cam groove for moving a focusing lens along the optical axis,
   wherein said focus cam tube rotates around the optical axis and moves along the optical axis in association with the rotation of said zoom cam tube during zooming, and
   wherein, while the focusing lens rotates around the optical axis during zooming, a rotational speed of said zoom cam tube and a rotational speed of the focusing lens are different from each other.

9. A zoom lens apparatus according to claim 8, further comprising an operation ring for driving the focusing lens, wherein the focusing lens moves along the cam groove of said focus cam tube while rotating around the optical axis according to an operation of said operation ring.

10. A zoom lens apparatus according to claim 9, wherein the focusing lens has a cam follower engaging the cam groove of said focus cam tube, and a long groove part extending along the optical axis, which the cam follower of the focusing lens engages, is connected to said operation ring.

11. A zoom lens apparatus according to claim 10, wherein the long groove part is curved.

12. A zoom lens apparatus according to claim 8, further comprising a zoom operation ring for driving the variator lens, wherein said zoom cam tube rotates around the optical axis according to an operation of said zoom operation ring.

13. A zoom lens apparatus according to claim 8, further comprising a fixed tube having a straight groove extending along the optical axis, wherein a cam follower provided on the variator lens engages the straight groove of said fixed tube and the cam groove of said zoom cam tube.

14. A zoom lens apparatus according to claim 13, wherein said fixed tube further has a curved groove formed thereon, said zoom cam tube further has a straight groove formed thereon, and said focus cam tube has a cam follower engaging the curved groove of said fixed tube and the straight groove of said zoom cam tube.

15. A zoom lens apparatus having an optical axis, comprising:
   a zoom cam tube arranged to rotate around the optical axis and having a cam groove for moving a variator lens along the optical axis and a cam groove for moving a focusing lens along the optical axis,
   wherein said zoom cam tube moves along the optical axis while rotating around the optical axis during zooming, and said focusing lens rotates around the optical axis during zooming, a rotational speed of said zoom cam tube and a rotational speed of said focusing lens during zooming are different from each other.

16. A zoom lens apparatus having an optical axis, comprising:
   a zoom cam tube arranged to rotate around the optical axis during zooming and having a cam groove for moving a variator lens along the optical axis
   a focus cam tube having a cam groove for moving a focusing lens along the optical axis; and
   a transmission tube arranged to move along the optical axis while rotating around the optical axis in association with the rotation of said zoom cam tube during zooming, wherein said focus cam tube moves along the optical axis in association with the rotation around said optical axis and the moving along the optical axis of said transmission tube during zooming, wherein a rotational speed of said zoom cam tube and a rotational speed of said transmission tube during zooming are different from each other.

17. A zoom lens apparatus having an optical axis, comprising:

a zoom cam tube arranged to rotate around the optical axis during zooming and having a cam groove for moving a variator lens along the optical axis;

a focus cam tube having a cam groove for moving a focusing lens along the optical axis and arranged to move along the optical axis while rotating around the optical axis during zooming; and a transmission tube arranged to move along the optical axis while rotating around the optical axis in association with the rotation of said zoom cam tube during zooming, wherein said focus cam tube rotates around the optical axis and moves along the optical axis in association with the rotation around said optical axis and the moving along the optical axis of said transmission tube during zooming, wherein a rotational speed of said zoom cam tube and a rotational speed of said focus cam tube during zooming are different from each other.

18. A zoom lens apparatus having an optical axis, comprising:

a zoom cam tube arranged to rotate around the optical axis during zooming and having a cam groove for moving a variator lens along the optical axis, said zoom cam tube further moving along the optical axis during zooming; and a focus cam tube having a cam groove for moving a focusing lens along the optical axis, wherein said focus cam tube moves along the optical axis while rotating around the optical axis during zooming, and wherein a rotational speed of said zoom cam tube and a rotational speed of said focus cam tube during zooming are different from each other.

19. A zoom lens apparatus according to claim 6, wherein the focus lens has a cam follower engaging the cam groove of said focus cam tube and a key follower conducting the operation of said operation ring, said operation ring has a long groove part extending along the optical axis, said long groove part, which the key follower engages, is connected to said operation ring and said focus lens.

20. A zoom lens apparatus according to claim 9, wherein the focus lens has a cam follower engaging the cam groove of said focus cam tube and a key follower conducting the operation of said operation ring, said operation ring has a long groove part extending along the optical axis, said long groove part, which the key follower engages, is connected to said operation ring and said focus lens.

21. A zoom lens apparatus having an optical axis, comprising:

a zoom cam member arranged to rotate around the optical axis and having a cam for moving a variator lens along the optical axis;

a focus cam member having a cam for moving a focusing lens along the optical axis;

wherein said focus cam member rotates around the optical axis and moves along the optical axis in association with the rotation of said zoom cam member during zooming, and wherein a rotational speed of said zoom cam member and a rotational speed of said focus cam member during zooming are different from each other.

22. A zoom lens apparatus according to claim 21, wherein the rotational speed of said focus cam member during zooming becomes lower on a wide-angle side and higher on a telephoto side as compared with the rotational speed of said zoom cam member.

23. A zoom lens apparatus according to claim 21, wherein a rotational speed of said focus cam member during zooming are different from each other as the zooming proceeds form the wide-angle side toward the middle side.

24. A zoom lens apparatus according to claim 21, wherein a rotational speed of said focus cam member during zooming are different from each other as the zooming proceeds from the middle side toward the telephoto side.

25. A zoom lens apparatus according to claim 23, wherein a rotational speed of said focus cam member during zooming becomes lower as the zooming proceeds from the wide-angle side toward the middle side as compared with the rotational speed of said zoom cam member.

26. A zoom lens apparatus according to claim 24, wherein a rotational speed of said focus cam member during zooming becomes higher as the zooming proceeds from the middle side toward the telephoto side as compared with the rotational speed of said zoom cam member.

27. A zoom lens apparatus having an optical axis, comprising:

a zoom cam member arranged to rotate around the optical axis and having a cam for moving a variator lens along the optical axis; and a focus cam member having a cam for moving a focusing lens along the optical axis;

wherein said focus cam member rotates around the optical axis and moves along the optical axis in association with the rotation of said zoom cam member during zooming, and wherein, while the focusing lens rotates around the optical axis during zooming, a rotational speed of said zoom cam member and a rotational speed of said focusing lens are different from each other.

28. A zoom lens having an optical axis, comprising a zoom cam member arranged to rotate around the optical axis during zooming and having a cam for moving a variator lens along the optical axis;

a focus cam member having a cam for moving a focusing lens along the optical axis;

a transmission member arranged to move along the optical axis while rotating around the optical axis in association with the rotation of said zoom cam member during zooming wherein said focus cam member move along the optical axis in association with the rotation around said optical axis and the moving along the optical axis of said transmission member during zooming, wherein a rotational speed of said zoom cam member and a rotational speed of said transmission member during zooming are different from each other.

29. A zoom lens apparatus having an optical axis, comprising:
- a zoom cam member arranged to rotate around the optical axis during zooming and having a cam for moving a variator lens along the optical axis;
- a focus cam member having a cam for moving a focusing lens along the optical axis and arranged to move along the optical axis while rotating around the optical axis during zooming;
- a transmission member arranged to move along the optical axis while rotating around the optical axis in association with the rotation of said zoom cam member during zooming
- wherein said focus cam member rotates around the optical axis and moves along the optical axis in association with the rotation around said optical axis and the moving along the optical axis of said transmission member during zooming,
- wherein a rotational speed of said zoom cam member and a rotational speed of said focus cam member during zooming are different from each other.

30. A zoom lens apparatus having an optical axis, comprising:
- a zoom cam member arranged to rotate around the optical axis and having a cam for moving a variator lens along the optical axis;
- a focus cam member having a cam for moving a focusing lens along the optical axis;
- wherein said focus cam member rotates around the optical axis and moves along the optical axis in association with the rotation of said zoom cam member during zooming, and
- wherein the a rotational displacement amount of said zoom cam member and the rotational displacement amount of said focus cam member during zooming are different from each other.

31. A zoom lens apparatus according to claim 30,
- wherein a rotational displacement amount of said cam member and the rotational displacement amount of said focus member during zooming are different from each other as the zooming proceeds from the wide-angle side toward the middle side.

32. A zoom lens apparatus according to claim 30,
- wherein a rotational displacement amount of said zoom cam and the rotational displacement amount of said focus member during zooming are different from each other as the zooming proceeds from the middle side toward the telephoto side.

33. A zoom lens apparatus according to claim 31,
- wherein a rotational displacement amount of said focus member during zooming becomes smaller as the zooming proceeds from the wide-angle side toward the middle side as compared with the rotational displacement amount of said zoom cam member.

34. A zoom lens apparatus according to claim 32,
- wherein a rotational displacement amount of said focus member during zooming becomes larger as the zooming proceeds from the middle side toward the telephoto side as compared with the rotational displacement amount of said zoom cam member.

35. A zoom lens apparatus having an optical axis, comprising:
- a zoom cam member arranged to rotate around the optical axis during zooming and having a cam for moving a variator lens along the optical axis, the zoom cam member further moving along the optical axis during zooming; and
- a focus cam member having a cam for moving a focusing lens along the optical axis;
- wherein said focus cam member moves along the optical axis while rotating around the optical axis during zooming, and
- wherein a rotational speed of said zoom cam member and a rotational speed of said focus cam member during zooming are different from each other.

36. A zoom lens apparatus having an optical axis, comprising:
- a zoom cam member arranged to rotate around the optical axis during zooming and having a cam for moving a variator lens along the optical axis, said zoom cam member further moving along the optical axis during zooming; and
- a focus cam member having a cam for moving a focusing lens along the optical axis;
- wherein said focus cam member moves along the optical axis while rotating around the optical axis during zooming, and
- wherein a rotational displacement amount of said zoom cam member and the rotational displacement amount of said focus member during zooming are different from each other.

37. A zoom lens apparatus according to claim 36,
- wherein a rotational displacement amount of said zoom cam member and the rotational displacement amount of said focus member during zooming are different from each other as the zooming proceeds from the wide-angle side toward the middle side.

38. A zoom lens apparatus according to claim 36,
- wherein a rotational displacement amount of said zoom cam and the rotational displacement amount of said focus member during zooming are different from each other as the zooming proceeds from the middle side toward the telephoto side.

39. A zoom lens apparatus according to claim 37,
- wherein a rotational displacement amount of said focus member during zooming becomes smaller as the zooming proceeds from the wide-angle side toward the middle side as compared with the rotational displacement amount of said zoom cam member.

40. A zoom lens apparatus according to claim 38,
- wherein a rotational displacement amount of said focus member during zooming becomes larger as the zooming proceeds from the middle side toward the telephoto side as compared with the rotational displacement amount of said zoom cam member.

* * * * *

UNITED STATES PATENT AND TRADEMARK OFFICE
CERTIFICATE OF CORRECTION

PATENT NO. : 6,381,076 B1
DATED : April 30, 2002
INVENTOR(S) : Seiichi Kashiwaba It is certified that error appears in the above-identified patent and that said Letters Patent is hereby corrected as shown below:

Column 5,
Line 24, delete "owing" and insert -- Owing --.

Column 8,
Line 3, delete "Wbeing" and insert -- $W^\infty$being --.

Column 16,
Line 11, delete "93" and insert -- $\theta 3$ --.
Line 13, delete "62" and insert -- $\theta 2$ --.

Column 20,
Line 61, delete "axis" and insert -- axis; --.

Column 22,
Line 60, delete "zooming" and insert -- zooming, --.
Line 61, delete "move" and insert -- moves --.

Signed and Sealed this

Tenth Day of December, 2002

JAMES E. ROGAN
*Director of the United States Patent and Trademark Office*